United States Patent [19]

Schwarz

[11] Patent Number: 5,019,756
[45] Date of Patent: May 28, 1991

[54] PROCESS AND ELECTRONIC CIRCUIT FOR CONTROLLING A BRUSHLESS DIRECT CURRENT MOTOR

[75] Inventor: Marcos G. Schwarz, Joinville, Brazil

[73] Assignee: Empresa Brasileira De Compressores S.A., Joinville SC, Brazil

[21] Appl. No.: 500,143

[22] Filed: Mar. 27, 1990

[30] Foreign Application Priority Data

Mar. 27, 1989 [BR] Brazil ................................ PI8901539

[51] Int. Cl.⁵ .............................................. H02P 6/02
[52] U.S. Cl. ................................... 318/254; 318/138; 318/430
[58] Field of Search ............... 318/138, 254, 439, 430, 318/431, 432, 433

[56] References Cited

U.S. PATENT DOCUMENTS

| | | | |
|---|---|---|---|
| 4,580,082 | 4/1986 | Guerin-Pinaud | 318/138 X |
| 4,603,283 | 7/1986 | Oltendorf | 318/254 |
| 4,673,849 | 6/1987 | Sears et al. | 318/254 X |
| 4,678,973 | 7/1987 | Elliott et al. | 318/138 X |
| 4,712,050 | 12/1987 | Nagasawa et al. | 318/138 X |
| 4,874,993 | 10/1989 | Tanaka et al. | 318/254 |
| 4,928,043 | 5/1990 | Plunkett | 318/254 |

*Primary Examiner*—Bentsu Ro
*Attorney, Agent, or Firm*—Darby & Darby

[57] ABSTRACT

A method and electronic circuit for controlling a brushless direct current motor, the motor having stator coils and a rotor with permanent magnets, in which the rotor position is detected by induced voltages. A control circuit has an inverter for supplying current ($I_1$, $I_2$, $I_3$) to the stator coils (1, 2, 3); a circuit detecting the relative position of the rotor-stator from the induced voltages; and a control circuit processing information ($I_m$) of current being supplied by the inverter to the stator coils, reference speed ($W_{ref}$) and on rotor position ($P_1$, $P_2$, $PP_3$) by sending control signals ($S_1$ to $S_6$) to the inverter. The control circuit comprises a main logic circuit or digital memory, delay elements connected in series, a circuit controlling the supply of current to the motor, a circuit detecting the minimum speed limit of the motor, a circuit for converting the frequency/voltage, a voltage comparator circuit and a Proportional-Integral-Derivative circuit.

15 Claims, 5 Drawing Sheets

| LINE | E1 | E2 | Px | Py | Pz | P1 | P2 | P3 | E9 | S1 | S2 | S3 | S4 | S5 | S6 | S7 | S8 | |
|---|---|---|---|---|---|---|---|---|---|---|---|---|---|---|---|---|---|---|
| 1 | 0 | X | X | X | X | X | X | X | X | 0 | 0 | 0 | 0 | 0 | 0 | 0 | 0 | SHUT-OFF |
| 2 | 1 | X | 0 | 0 | 0 | X | X | X | 1 | 1 | 0 | 0 | 0 | 1 | 0 | 0 | 1 | POS. 1 |
| 3 | 1 | X | 0 | 0 | 0 | X | X | X | 0 | 0 | 0 | 0 | 0 | 0 | 0 | 0 | 1 | POS. 1 |
| 4 | 1 | X | 1 | 0 | 0 | X | X | X | 1 | 1 | 0 | 0 | 0 | 0 | 1 | 0 | 1 | POS. 2 |
| 5 | 1 | X | 1 | 0 | 0 | X | X | X | 0 | 0 | 0 | 0 | 0 | 0 | 0 | 0 | 1 | POS. 2 |
| 6 | 1 | X | 1 | 1 | 0 | 1 | 0 | 1 | 1 | 1 | 0 | 0 | 0 | 1 | 0 | 1 | 1 | |
| 7 | 1 | X | 1 | 1 | 0 | 1 | 0 | 0 | 1 | 1 | 0 | 0 | 0 | 0 | 1 | 0 | 1 | |
| 8 | 1 | X | 1 | 1 | 0 | 1 | 1 | 0 | 1 | 0 | 1 | 0 | 0 | 0 | 1 | 1 | 1 | |
| 9 | 1 | X | 1 | 1 | 0 | 0 | 1 | 0 | 1 | 0 | 1 | 0 | 1 | 0 | 0 | 0 | 1 | AUTO- |
| 10 | 1 | X | 1 | 1 | 0 | 0 | 1 | 1 | 1 | 0 | 0 | 1 | 1 | 0 | 0 | 1 | 1 | CONTROLLED |
| 11 | 1 | X | 1 | 1 | 0 | 0 | 0 | 1 | 1 | 0 | 0 | 1 | 0 | 1 | 0 | 0 | 1 | |
| 12 | 1 | X | 1 | 1 | 0 | 1 | 0 | 1 | 0 | 0 | 0 | 0 | 0 | 0 | 0 | 1 | 1 | |
| 13 | 1 | X | 1 | 1 | 0 | 1 | 0 | 0 | 0 | 0 | 0 | 0 | 0 | 0 | 0 | 0 | 1 | |
| 14 | 1 | X | 1 | 1 | 0 | 0 | 1 | 0 | 0 | 0 | 0 | 0 | 0 | 0 | 1 | 1 | 1 | |
| 15 | 1 | X | 1 | 1 | 0 | 0 | 1 | 0 | 0 | 0 | 0 | 0 | 0 | 0 | 0 | 0 | 1 | |
| 16 | 1 | X | 1 | 1 | 0 | 0 | 1 | 1 | 0 | 0 | 0 | 0 | 0 | 0 | 0 | 1 | 1 | |
| 17 | 1 | X | 1 | 1 | 0 | 0 | 0 | 1 | 0 | 0 | 0 | 0 | 0 | 0 | 0 | 0 | 1 | |
| 18 | 1 | 1 | 1 | 1 | 1 | 0 | 1 | 1 | 1 | 1 | 0 | 0 | 0 | 1 | 0 | 1 | 1 | |
| 19 | 1 | 1 | 1 | 1 | 1 | 1 | 0 | 0 | 1 | 1 | 0 | 0 | 0 | 0 | 1 | 0 | 1 | |
| 20 | 1 | 1 | 1 | 1 | 1 | 1 | 1 | 0 | 1 | 0 | 1 | 0 | 0 | 0 | 1 | 1 | 1 | AUTO- |
| 21 | 1 | 1 | 1 | 1 | 1 | 0 | 1 | 0 | 1 | 0 | 1 | 0 | 1 | 0 | 0 | 0 | 1 | CONTROLLED |
| 22 | 1 | 1 | 1 | 1 | 1 | 0 | 1 | 1 | 1 | 0 | 0 | 1 | 1 | 0 | 0 | 1 | 1 | FOR Rot > Rmin |
| 23 | 1 | 1 | 1 | 1 | 1 | 0 | 0 | 1 | 1 | 0 | 0 | 1 | 0 | 1 | 0 | 0 | 1 | |
| 24 | 1 | 1 | 1 | 1 | 1 | 1 | 1 | 0 | 0 | 0 | 0 | 0 | 0 | 0 | 0 | 1 | 1 | |
| 25 | 1 | 1 | 1 | 1 | 1 | 1 | 0 | 0 | 0 | 0 | 0 | 0 | 0 | 0 | 0 | 0 | 1 | |
| 26 | 1 | 1 | 1 | 1 | 1 | 1 | 1 | 0 | 0 | 0 | 0 | 0 | 0 | 0 | 0 | 1 | 1 | |
| 27 | 1 | 1 | 1 | 1 | 1 | 0 | 1 | 0 | 0 | 0 | 0 | 0 | 0 | 0 | 0 | 0 | 1 | |
| 28 | 1 | 1 | 1 | 1 | 1 | 0 | 1 | 1 | 0 | 0 | 0 | 0 | 0 | 0 | 0 | 1 | 1 | |
| 29 | 1 | 1 | 1 | 1 | 1 | 0 | 0 | 1 | 0 | 0 | 0 | 0 | 0 | 0 | 0 | 0 | 1 | |
| 30 | 1 | 0 | X | X | 1 | X | X | X | X | 0 | 0 | 0 | 0 | 0 | 0 | 0 | 0 | SHUT-OFF |

PROCESS AND ELECTRONIC CIRCUIT FOR CONTROLLING A BRUSHLESS DIRECT CURRENT MOTOR

BACKGROUND OF THE INVENTION

This invention refers to a process for starting and operating a brushless direct current motor and the electronic circuit thereof, specifically that of the type which detects the rotor position through induced voltages.

Brushless direct current motors are of interest in applications requiring high reliability and high efficiency such as household appliances, pumps and ventilators. Said motors include a stator having coils, a permanent magnet rotor, an inverter feeding current to the stator coils, a rotor position sensor which gives information on the time and period each coil assembly has to be kept powered and a central control which processes current, speed and position of the rotor information and sends command pulses to the inverter. In some applications requiring a simple and a strong structure of the motor, without using rotor position detection is effected by observing the induced voltages on the motor windings. It is necessary in these types of motor to use a special technique to start the motor, since when in a static situation without rotor movement, voltages are not induced to the coils, and the rotor position is unknown.

Several techniques for starting said motors are known. One is to detect the rotor position when it is stopped by means of a secondary sensor which is only used for motor starting. In this way, it is possible to decide upon which motor phases have to be powered in order that torque is produced in the desired direction, thereby starting the motor.

A problem with this solution is the need of an additional sensor being installed inside the motor plus the connections between such sensor and the control circuit, which increase the assembly complexity and cost.

Another solution, as described in the Japanese document, Kokai No. 55,5035 A, is to cause the inverter to supply current to the stator coils at a correct sequence thereby gradually increasing the frequency. This ignores the induced voltages being used to detect the rotor position, thereby causing the rotor to accelerate until reaching a speed at which the voltages induced in the stator coils are enough to cause the rotor position be detected. During this first step, the motor operates as a synchronous motor. Once this condition is reached, the control circuit observes the information given by the position sensor through the voltages induced to the stator, and the acceleration and the normal operation of the motor is continued and now it is operating in a self-controlled way.

One advantage of this method is that, depending upon the current value applied to the stator during the start in a synchronous form, synchronism loss can occur, resulting in stopping of the rotor or in some cases the motor will start in the reverse direction opposed to the desired direction. A further drawback is the vibration level which is relatively high during synchronous operation. The implementation of this solution can be complex, mainly if the method for determining the condition for the commutation from synchronous form to self-controlled form is based upon the observation of the phase between the internally generated synchronous signals and the signals given by the position sensor through induced voltages. This already known solution is implemented with the help of a microprocessor.

OBJECTS OF THE INVENTION

It is an object of this invention to provide a method and a control circuit to start and operate a brushless direct current motor of the type which detects the rotor position through the voltages induced in the stator coils, said method and the control circuit being able to repeat from time to time the motor start, even when the current exceeds the motor start capacity or even when a current overload stops the operation thereof.

It is further an object of this invention to provide a method and a control circuit of the above mentioned type which provides a motor start under severe current supply conditions in an accurate way and causing no vibrations to the motor.

A further object of this invention is to provide a method and a control circuit of the above mentioned type providing a motor start employing no secondary sensors to detect the rotor position at rest.

It is a further object of this invention to provide a method and a control circuit of the above mentioned type, which are able to overcome the above mentioned technical drawbacks by employing a simple electronic circuit without using a microprocessor.

BRIEF DESCRIPTION OF THE INVENTION

Said objects are accomplished from an electronic control circuit for a brushless direct current motor of the type detecting the rotor position through induced voltages. The motor has stator coils and a rotor having permanent magnets. The control circuit has an inverter which supplies current to the stator coils; a rotor-stator relative position circuit detector by means of the induced voltages; and a control circuit processing information on the current supplied by the inverter to the stator coil, reference speed and, rotor position to send control signals to the inverter.

The invention operates basically as follows:

1. A predetermined assembly of motor stator coils is supplied with a current having an increasing magnitude up to a predetermined limit, this causing the motor rotor to be located to a predetermined position.

This is done for a predetermined duration and is the first stage for the start.

2. The current magnitude reached at the starting is transferred to another predetermined assembly of coils, causing the rotor to move to another position which corresponds to a pitch in the desired direction.

This is the second stage of the start and is of a predetermined duration.

3. Motor operation is commuted to self-controlled form, and the position information given by the rotor position sensor though induced voltages is observed.

This is the third starting stage and is also for a predetermined duration. The self-control condition kept ignoring the motor speed.

4. In the self-controlled operation stage, the motor is caused to be at a speed which is higher than a predetermined minimum value.

This stage is of undetermined duration and is the fourth stage for the motor operation.

5. The supply of current to the motor is stopped when the condition of the motor speed is lower than the predetermined minimum limit and is kept interrupted until a predetermined period of time is elapsed, after which time the starting control cycle will be re-initiated as in 1. above.

Also according to this invention, the control circuit to start and operate the brushless direct current motor of the type for detecting the rotor position through induced voltages has:

1. a main logic circuit (memory) whose input signals (addresses) are:
   (a) logic signals from the position sensor through induced voltages,
   (b) logic signals from delay elements
   (c) logic signals from the minimum speed limit detector,
   (d) logic signal for the general control of the inverter keys,
   (e) logic signal for general control and whose output signals (data) are:
      i) logic signals for individual control of each inverter key,
      ii) logic signal for controlling the delay elements and gradual control of current,
      iii) logic signal having a frequency which is proportional to the motor speed.

2. Delay elements which are connected in series where the first is released by a logic signal from the main logic circuit, with the output of one delay element being connected to one of the inputs of the logic circuit and also to the input of the following delay element on a successive basis.

3. A circuit for control of application of current to the motor in gradual and increasing form during the start first stage, this circuit being released by a logic signal from the main logic circuit, and the output thereof controls the maximum voltage limit corresponding to the current t be applied to the motor.

4. A circuit which detects the minimum motor speed limit supplies a logic signal to the main logic circuit resulting from the comparison between an analog signal corresponding to the motor speed and a voltage supplied by a voltage divider being adjustable and corresponding to the minimum permissible speed of motor operation.

5. A circuit which converts frequency/voltage and receives a logic signal from the main logic circuit and generates an analog signal corresponding to the motor speed.

6. A comparator circuit provided with hysteresis, which generates a logic signal for the main logic circuit from the comparison between the analog signal corresponding to the current that circulates in the motor and the analog signal corresponding to the current to be applied to the motor.

7. A proportional-integral-derivative (PID) circuit which receives an analog signal corresponding to the motor speed, a voltage externally supplied corresponding to the desired speed of the motor and as a result supplies a voltage signal corresponding to the current to be applied to the motor.

Contrary to the already known solutions to provide the start of brushless direct current motors of the type which detects the rotor position by induced voltages, the method and apparatus herein provided allows the start under severe load conditions in a smooth way without vibration and repeats indefinitely the start operation under overload conditions.

The circuit advantageously performs all of the steps of the described process without a microprocessor and only uses a combination of logic device elements and voltage comparators.

BRIEF DESCRIPTION OF THE DRAWINGS

The invention will be hereinafter described with reference to the following specification and annexed drawings, wherein.

DETAILED DESCRIPTION OF THE PREFERRED EMBODIMENT

Figure 2:
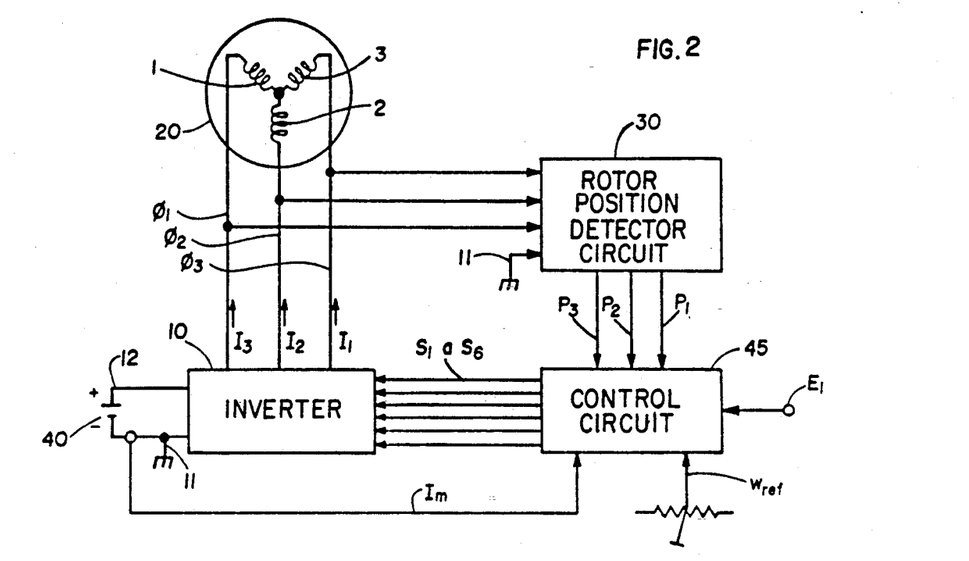
FIG. 2 illustrates a block diagram of the control circuit.

Referring to FIG. 2, the inverter 10 supplies currents Il, I2, I3 of three phases 1, 2, 3 to the brushless direct current motor 20. Voltages of phases 1, 2, 3 are also applied to the rotor position detector circuit 30 through induced voltages. The negative potential terminal 11 of the voltage supply 40, which is the reference (ground) potential for all circuits, is also connected to circuit 30.

Through terminals P1, P2, and P3, the rotor position detector circuit supplies three logic signals corresponding to the rotor-stator relative position to the control circuit 45.

Based on received information of rotor position, motor current (which is represented by a voltage signal at the terminal $I_m$) as well as the reference speed (which is represented by a voltage signal at $W_{ref}$ terminal), the control circuit 45 sends control logic signals through terminals S1 and S6 to the switching devices $T_1$ and to $T_6$ of inverter 10.

Figure 2A:
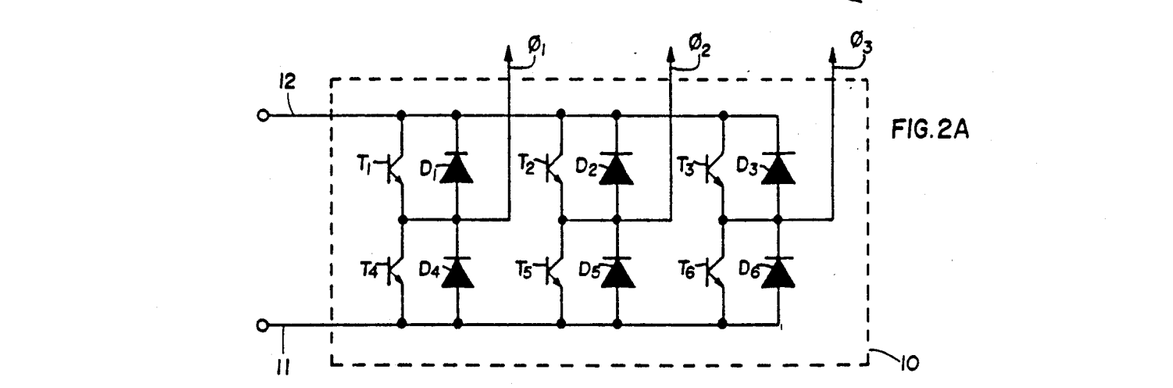
FIG. 2A illustrates the inverter circuit.

As illustrated in FIG. 2A, the inverter circuit 10 is made up of six electronic switching devices (such as transistors) T1 to T6, each driven by signals S1 to S6 respectively applied to the control element (e.g., the transistor base electrode) of each switching device. The inverter circuit also has six diodes D1 to D6, to control the current circuit Il, I2 and I3 (FIG. 2) which is supplied to motor 20 of phases 1, 2, and 3 in an order which is established in the time diagram in FIG. 2B.

Figure 1:
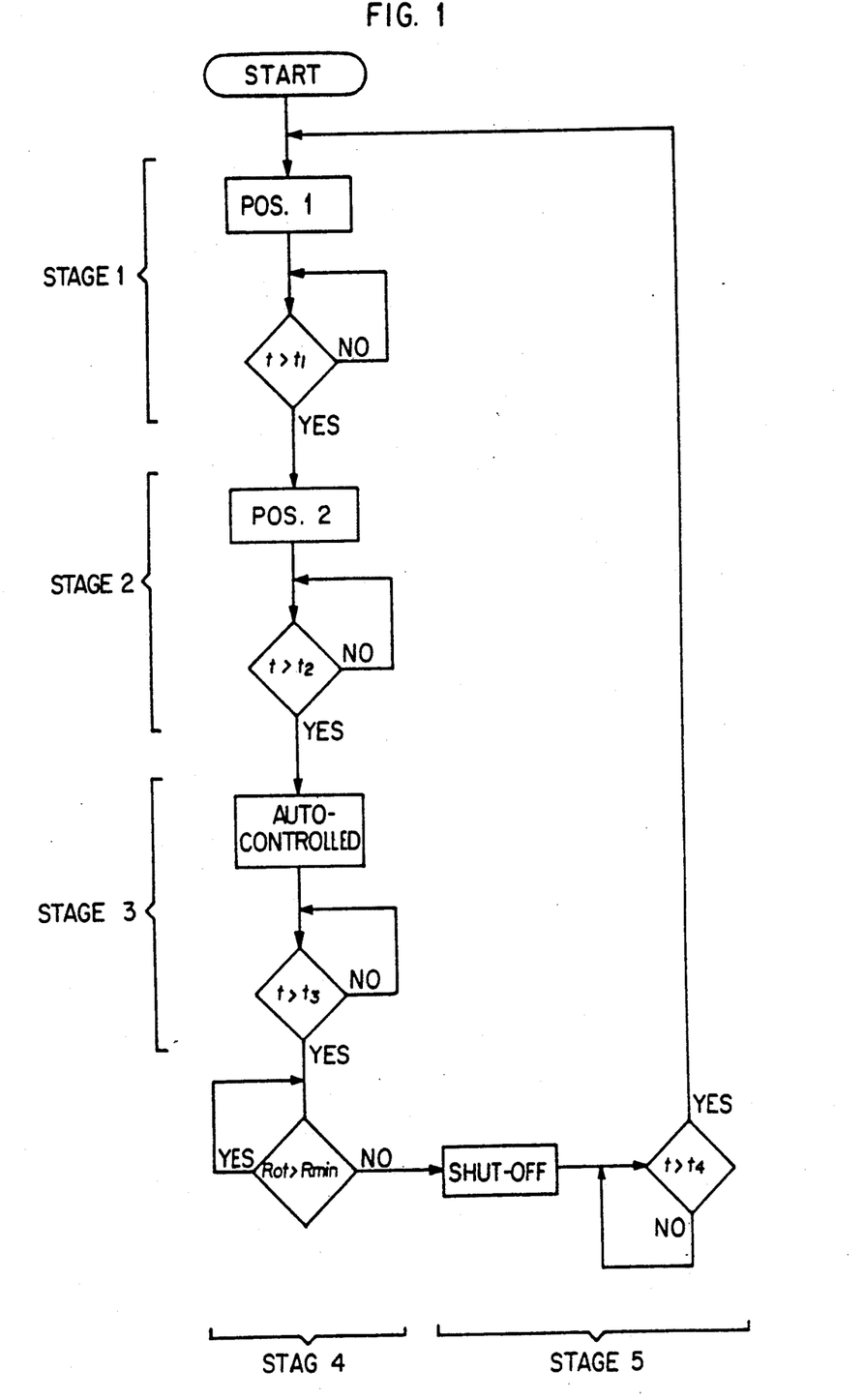
FIG. 1 illustrates a flow chart of the process as provided by this invention.

First Stage - With reference to FIG. 1, the motor start and operation has a first stage of start, in applying a current of magnitude gradually increasing from zero up to the value corresponding to the motor maximum torque in a predetermined coil assembly. This causes the rotor to move out of position of rest, where such position being unknown, to be placed into a predetermined position 1 shown in FIG. 2B, by a smooth movement. Since the current increases gradually vibrations are avoided.

This stage is of predetermined duration t1.

Second Stage - In the second stage of the motor start, the current is transferred to other predetermined assembly of coils, position 2(FIG. 2b) corresponding to the advance of the smaller angular pitch in the stator field in the desired turn direction.

Figure 2B:
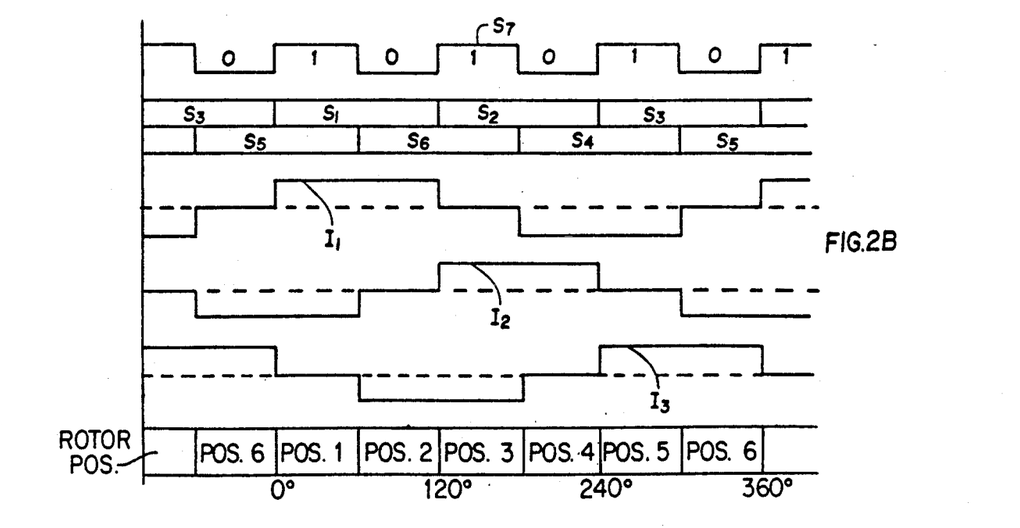
FIG. 2B shows the time diagram for the motor currents.

In this way, the rotor will start a rotation movement with a maximum acceleration in the desired direction.

The duration of this stage is a predetermined time $t_2$ (FIG. 1). This time must be nearly equal to the time that the rotor takes to move from position 1 to the position 2.

At the end of the period $t_2$, when the rotor is arriving to position 2, its speed will already be sufficient for the position detector circuit 30 (FIG. 2) to show a correct indication of the rotor position.

Third Stage - The third stage of start (FIG. 1) involves supplying current to the motor coils 20 according to information of the rotor position sent by the rotor position detector circuit 30 by induced voltages (FIG. 2) and according to the order as established in the time diagram in FIG. 2b. In this way the self-controlled operation of the motor will start.

This third stage (FIG. 1), where the condition of self-controlled operation is self-controlled and of a predetermined duration $t_3$. During this period $t_3$, if the start is successful, the motor speed will increase. Should the motor shaft be blocked by any reason or the load be excessive, the shaft will return to the rest situation.

Fourth Stage - The fourth stage (FIG. 1) involves continuing in the self-controlled state but conditioned to the motor speed which is above the predetermined minimum limit ($R_{ot} > R_{min}$). In this way, if the start is successful, the motor will be in a situation of operation under permanent regimen, from which it will be out if the motor encounters overload which reduces the speed below the predetermined minimum limit. If the start is not successful because of mechanical interlock of the motor shaft or by overload, or if after an operation period under permanent regimen the condition of speed below the predetermined minimum limit is reached, stage 5 will start.

Fifth Stage - In the fifth stage (FIG. 1), all the inverter switching device T1 to T6 are shut off, and there is no supply of current to the motor coils. This condition is kept until a period of time $t_4$ has elapsed. This period of time $t_4$ can vary with the type of application and its objective is to await for the full stop of the motor to restart the start or await for the decrease of overload or disorder causing the motor to stop before repeating a new start.

Figure 5:
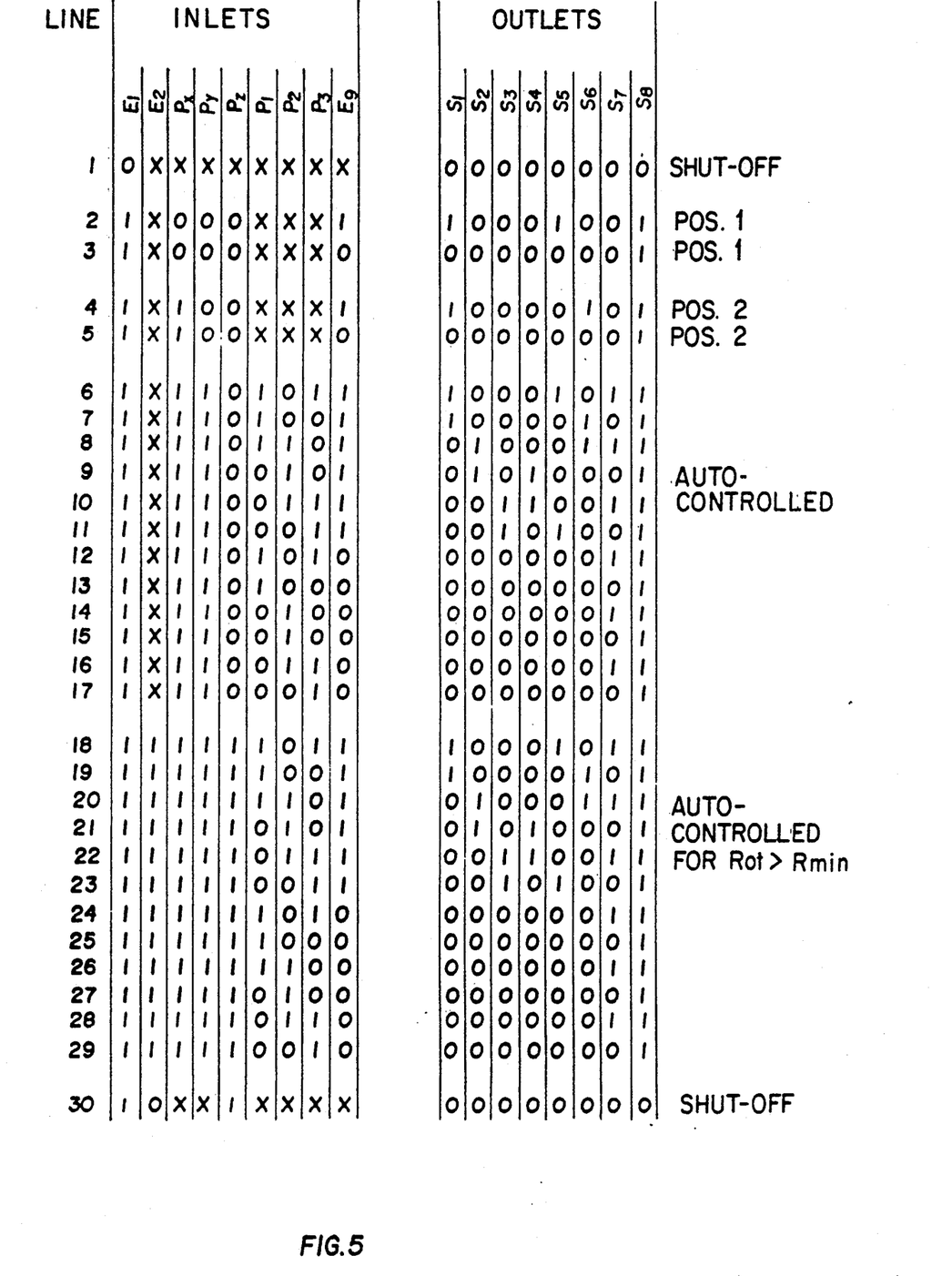
FIG. 5 shows a table of the input to and output from the logic circuit.

With reference to FIG. 2, the start and operation circuit 45 has its operation based upon a main logic circuit 50 (FIG. 3) which can be a memory of ROM or EPROM type in which a set of information is recorded which is summed up in the table shown in FIG. 5.

Stage 1 - At the starting of a motor operation cycle 20, when a zero logic level is at the input of the general control terminal $E_1$ (FIG. 3) of the memory 50, all outputs S1 to S6 remain at the zero logic level. The outputs S1 and S6 control respectively the switching devices T1 to T6 and the zero logic level at said outputs corresponds to the open (OFF) state of the switching devices.

In this situation corresponding to the first line of the table in FIG. 5, the switching devices T1-T6 remain open (OFF) notwithstanding the state of other memory 50 inputs. Also in this situation, the output S8 of memory 50 remains at a zero logic level, meaning that the logic level is also zero at the outputs Px, Py and Pz of each delay element 70, 80, 90 respectively. Also in this situation, the switch 141 of the circuit 140 (FIG. 3) is closed and causes the voltage level at the terminal $I_{ref}$ to be very near zero, which is the voltage being present at the reference terminal 11.

Stage 2 - When a logic level 1 is present at the general control terminal $E_1$, the stage 1 for the start will begin and corresponds to lines 2 and 3 of the table in FIG. 5. In the situation of line 2, S1 and S5 are at a logic level 1 meaning that the switching devices T1 and T5 of the inverter 10 (FIG. 2) are switched on, supplying current to coils 1 and 2 of the motor 20 thereby causing the rotor to be placed at position 1 (FIG. 2B). In this situation, as in any other, the current control in the motor is made switching a pair of the inverter switching devices on or off that in that situation are selected.

This general control of the inverter switching devices is made by the logic signal which is present at the input E9 of the memory 50, (FIG. 3 and FIG. 5), from a voltage comparator 10 provided with hysteresis. Comparator 100 compares the voltage at the terminal $I_m$ corresponding to an instantaneous current in the motor with the voltage at the terminal $I_{ref}$ corresponding to the current to be supplied to the motor. Also in this situation, the output signal $S_8$ of the memory 50 (FIG. 3) changes to the logic level 1, releasing the time counting delay 70 and opens at the same time the switch 141 of the circuit 140. This allows the voltage at the terminal $I_{ref}$ to increase gradually up to the voltage $V_z$ of the limiter 142, resulting in the gradual increase in the current in the motor during the first stage of the start as shown in the time diagram of FIG. 4.

At the moment at which, at the output Px of the delay 70, which determines the time $T_1$, the logic level changes to 1 (input Px of the memory 50), the situation will be that corresponding to lines 4 and 5 in the table of FIG. 5, when the inverter switching device $T_1$ and $T_6$ will be in condition, corresponding to position 2 (FIG. 2b). This is stage 2 of the start.

Stage 3 - The logic level 1 being present at the input of the delay 80, which determines the period $T_2$, releases the time counting thereof. After the time $t_2$ has elapsed, the rotor will have reached the position 2 (FIGS. 2, 3 and 4) and will already be in rotating movement in the desired direction, and at that moment the output of the delay 80 will be at the logic level 1 (input $P_y$ of the memory 50) and the stage 3 of the start (FIG. 1 and FIG. 4) will start corresponding to any of the lines 6 to 17 in the table of FIG. 5.

Figure 4:
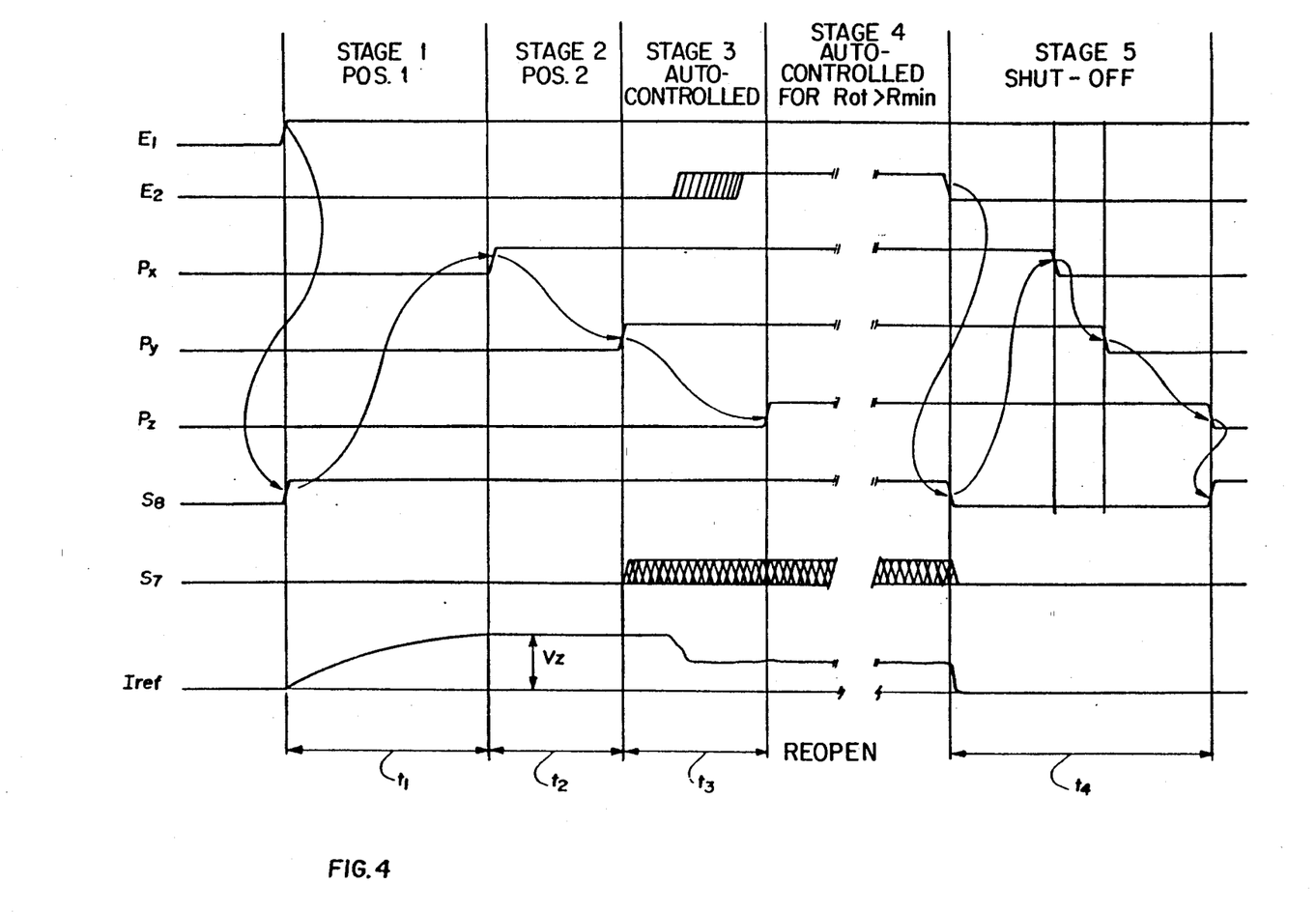
FIG. 4 shows a time diagram for the control steps.

The logic level 1, at the output of the delay 80, releases the time counting of the delay 90, FIG. 4, determining the period $t_3$. In this stage, the pair of inverter switching devices which conduct (ON) will be a function of the information on the position of the rotor which is present in the logic signals sent by the circuit 30 (FIG. 2) through terminals $P_1$, $P_2$, $P_3$. The motor will be at the self-controlled state under the regimen of acceleration until it reaches the speed established by the voltage present at the terminal $W_{ref}$. In this stage, when the motor is moving, the order of the time diagram in FIG. 2B will be followed, corresponding to the sequence of lines 6 to 11 or 12 to 17, FIG. 5.

Figure 3:
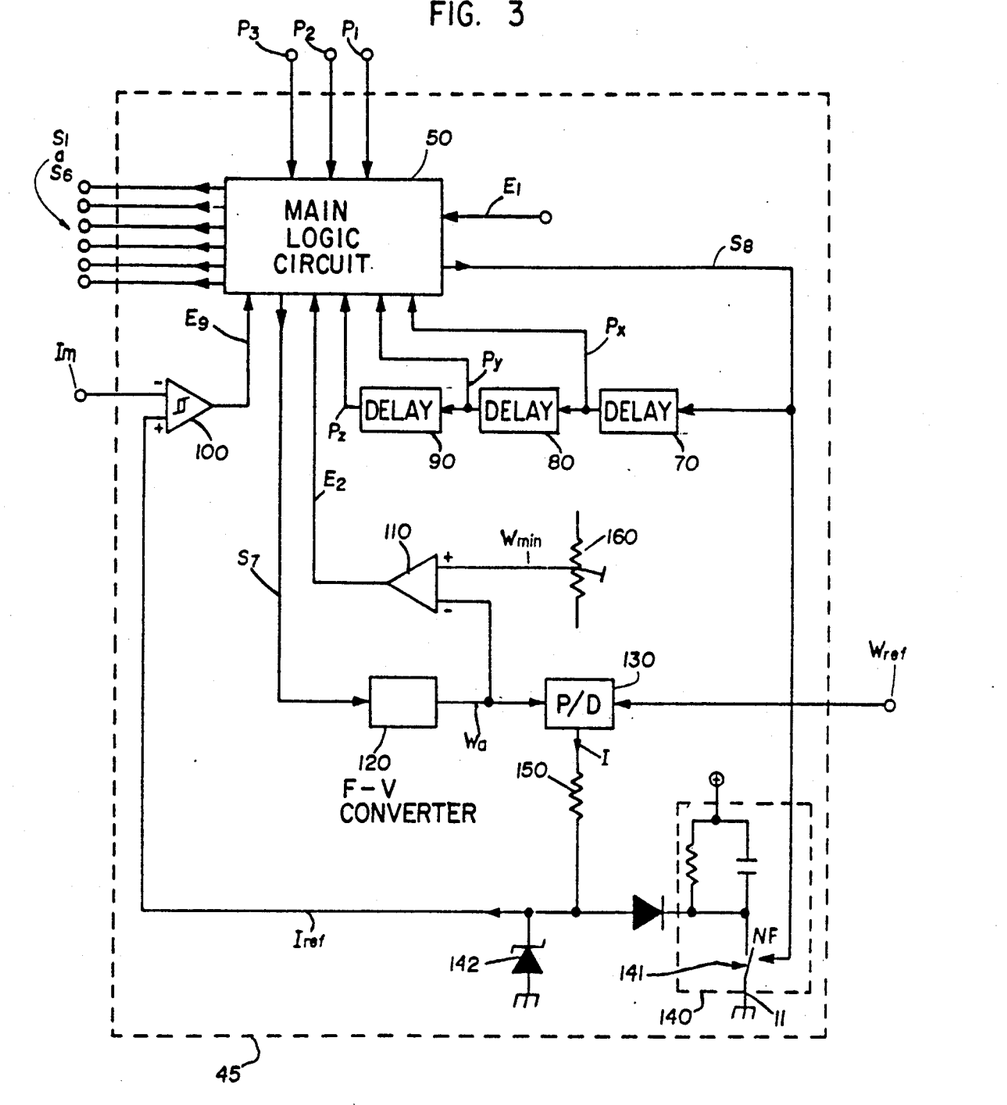
FIG. 3 illustrates the control circuit.
Figure 3A:
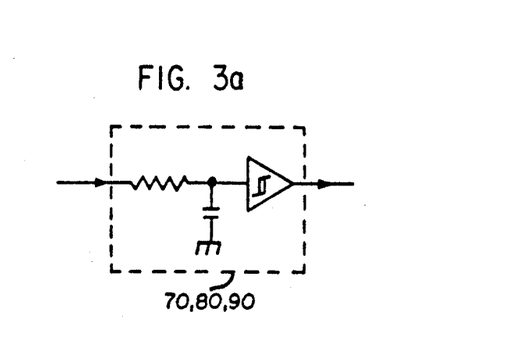
FIG. 3A illustrates the delay element circuit.

When this sequence is followed, the output S7 of the memory 50 (FIG. 2B) will show a logic signal with a frequency being proportional to the motor speed, which will be converted by the frequency/voltage converter circuit 120 at a corresponding voltage level, which is present at the terminal $W_a$ (FIG. 3). The comparison of this voltage with the voltage level, which is produced by the divider 160, at the terminal $w_{min}$ and corresponding to the minimum operation speed of the motor, will result in a logic signal at the output of the comparator 110, which will be sent to memory 50 by the terminal $E_2$. The logic level at the terminal $E_2$ indicates if the motor is rotating above or below the minimum limit as established by the corresponding voltage at the terminal $W_{min}$.

Stage 4 - After the period of time $t_3$ is elapsed, the delay 90 (FIG. 3), which has been released at the beginning of the stage 3, is at the logic level 1 at the output $P_z$ thereof when stage 4 will begin. Stage 4 (FIG. 4) corresponds to lines 18 and 29 in the table of FIG. 4. Stage 4 is different from stage 3 in that the permanence of the stage 4 is conditioned to the instantaneous speed of the motor above the minimum limit as predetermined by the voltage at the terminal $W_{min}$. In this stage, under permanent regimen, the motor will operate for an undetermined time following the sequence of capacity of the inverter switching devices as a function of the information on the position of the rotor which is supplied by the circuit 30.

In this stage, the logic level 1 is kept at the output S8 (FIG. 3) of the memory 50, thus maintaining the switch 141 open and the output $P_x$, $P_y$ and $P_z$ of the delay 70, 80 and 90 at the logic level 1. The speed control under a permanent regimen as a function of the load changes is made by the Proportional Integral Derivative (PID) circuit 130, which is a function of the voltage at the terminal $W_a$ (instantaneous speed) and the voltage at the terminal $W_{ref}$ (determined speed) generates a voltage signal at the terminal I which is proportional to the current to be applied to the motor. Any increase in the load is compensated by an increase being proportional to the current, and keeps the speed at the determined value.

Stage 5 - If at any time the instantaneous speed becomes lower than the predetermined minimum limit, the logic level at the output $E_2$ of the comparator 110 will be 1. This situation corresponds to line 30 in table, FIG. 5, by which the Stage 5 is characterized. At this stage all outputs $S_1$ to $S_6$ will be at zero, and keeps all switching devices T1 to T6 of the inventor 10 non-conducting (OFF) (FIG. 2A) thus preventing the current from flowing in the coils of the motor. Further in this stage, the logic level will be zero at the output S8 of the memory 50, thereby closing the switch 141 (FIG. 4) and also starting a new sequence of delay releases 70, 80, 90 as shown in time diagram, FIG. 4.

In every situation the logic level at the output $P_z$ of the delay 90 will be equal to 1, State 5 is maintained. When the output $P_z$ of the delay 90 is also at the logic level zero, after the time $t_4$ (FIG. 4) is counted from the beginning of the Stage 5, when the output S8 of the memory 50 (FIG. 3) is at the logic level zero until the moment all outputs $P_x$, $P_y$, $P_z$ of the delays 70, 80, 90 are at the logic level zero. This time $t_4$ is nearly equal to the sum of times $t_1$, $t_2$ and $t_3$ (FIG. 4).

What is claimed is:

1. A method for controlling a brushless direct current motor having a stator with coils and a rotor with permanent magnets of the type which detects the rotor position by induced voltages and is operated and controlled by circuit means including:
    an invertor which supplies current to the stator coils, means for detecting the rotor-stator relative position by the induced voltages, and a control circuit which processes information on the current supplied by the invertor to the stator coils, information on the position of the rotor, information on the reference speed, by sending control signals to the switching devices of the invertor;

the method of control cycle comprising the steps of:
    (a) supplying current to a predetermined assembly of the stator coils, with an increasing intensity up to a predetermined limit to place the rotor at a predetermined position;
    (b) transferring current to at least one other predetermined assembly of the stator coils to cause the rotor to move to another position corresponding to a pitch in the desired rotor turning direction;
    (c) commuting rotor rotation to self-controlled form and detecting the rotor position by the induced voltages;
    (d) operating in the self-controlled form with the rotor at a speed higher than a predetermined minimum value; and
    (e) interrupting the current supply to the motor when the condition of the motor speed is lower than the predetermined minimum value.

2. A method as in claim 1 further comprising the step of keeping the current supply interrupted until a predetermined period of time has elapsed after which the control cycle restarting occurs.

3. A method as in claim 2 wherein the step of transferring current is carried out with the current at the same magnitude as in the current supplying step.

4. A method as in claim 1 wherein steps a, b, and c are of a predetermined duration and comprise a 1st, 2nd and 3rd stage of motor start, respectively.

5. A method as in claim 1 wherein step d. is of an undetermined duration and comprises a motor operating stage.

6. An electronic circuit for controlling a brushless direct current motor, having a coiled stator and a rotor having permanent magnets and detecting the rotor position by induced voltages comprising:
    invertor circuit means having a plurality of switching elements for supplying current to the coils of the stator,
    means for detecting the rotor position by the induced voltages,
    control circuit means for processing information on current supplied by said invertor circuit means to the stator coils, information on the rotor position, information on the reference speed, sending control signals to the switching elements of the invertor circuit means, with logic circuit means including;
    comparator means for the control of the current supplied to the motor; and
    a Proportional - Integral - Derivative circuit, which receives an analog signal corresponding to the motor speed, a signal supplied externally corresponding to the speed to be supplied to the motor, and supplies an analog signal corresponding to the current to be applied to the motor.

7. An electronic circuit according to claim 6, wherein the logic circuit means receives as an input the following signals;
    logic signals produced by the rotor position detecting means;
    logic signals produced by delay means
    a logic signal produced by minimum speed limit detector;
    a logic signal for control of the switching elements and a logic signal for general control; and produces as output the following signals:
    logic signals for individual control of each switching element;

a logic signal for controlling the delay means and for controlling the motor driving current; and logic signal representing a signal with a frequency proportional to the motor speed.

8. An electronic circuit as in claim 7 wherein the delay means release timing count at each change of logic level at the input thereof.

9. An electronic circuit as in claim 6 wherein the control circuit means controls the current supplied to the motor in a gradual and increasing form during a first start stage.

10. An electronic circuit as in claim 6 wherein the control circuit means controls a maximum voltage limit analog signal corresponding to the current to be applied to the motor during a stage of the motor start.

11. An electronic circuit as in claim 7 wherein the minimum speed limit detector supplies the logic signal resulting from a comparison between an analog voltage corresponding to the instantaneous speed of the motor and a voltage corresponding to the permissible minimum speed for operating the motor.

12. An electronic circuit as in claim 6 further comprising frequency-voltage converter circuit means for receiving a logic signal produced by said logic circuit means for generating an analog signal corresponding to the instantaneous speed of the motor.

13. An electronic circuit as in claim 6 wherein said comparator means is provided with hysteresis and produces a logic signal from the comparison between an analog signal corresponding to the instantaneous current in the motor and an analog signal corresponding to the current to be applied to the motor.

14. An electronic circuit as in claim 6, wherein said control circuit means further comprises:

a logic circuit, a series of delay elements, the input of the first delay element connected to the logic circuit, each delay element having an output connected to the logic circuit and to the next delay element in the series, a current control means for controlling the magnitude of current supplied to the motor in the first stage of the motor start and having its input connected to the logic circuit, and said comparator means for detecting when the motor speed reaches a predetermined minimum speed.

15. An electronic circuit as in claim 14, wherein said comparator means is supplied with signals corresponding to actual current and desired motor current.

* * * * *

UNITED STATES PATENT AND TRADEMARK OFFICE
CERTIFICATE OF CORRECTION

PATENT NO. : 5,019,756

DATED : May 28, 1993

INVENTOR(S) : Marcos G. Schwars

It is certified that error appears in the above-indentified patent and that said Letters Patent is hereby corrected as shown below:

On the cover page: Item [73], please delete"Empresa Braileira De Compressores S. A." and substitute therefor --Empresa Brasileira de Compressores S. A. - EMBRACO --.

Signed and Sealed this

Eighteenth Day of October, 1994

Attest:

BRUCE LEHMAN

*Attesting Officer*   *Commissioner of Patents and Trademarks*